(12) United States Patent
Liu et al.

(10) Patent No.: US 11,156,564 B2
(45) Date of Patent: Oct. 26, 2021

(54) DIRT DETECTION ON SCREEN

(71) Applicants: Beijing BOE Optoelectronics Technology Co., Ltd., Beijing (CN); BOE Technology Group Co., Ltd., Beijing (CN)

(72) Inventors: Xiaolei Liu, Beijing (CN); Yunqi Wang, Beijing (CN); Minglei Chu, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 96 days.

(21) Appl. No.: 16/557,353

(22) Filed: Aug. 30, 2019

(65) Prior Publication Data

US 2020/0240927 A1    Jul. 30, 2020

(30) Foreign Application Priority Data

Jan. 29, 2019  (CN) .......................... 201910083851.X

(51) Int. Cl.
*G01N 21/94* (2006.01)
*G06T 7/149* (2017.01)
(Continued)

(52) U.S. Cl.
CPC ........... *G01N 21/94* (2013.01); *G06T 7/0002* (2013.01); *G06T 7/11* (2017.01); *G06T 7/149* (2017.01)

(58) Field of Classification Search
CPC .......... G01N 21/94; G06T 2207/30121; G06T 7/0002; G06T 7/0004; G06T 7/11; G06T 7/12; G06T 7/149; G06T 7/174
See application file for complete search history.

(56) References Cited

U.S. PATENT DOCUMENTS 4,958,373 A * 9/1990 Usami ................ G01N 21/9501
                                                            348/126
6,643,395 B1 * 11/2003 Okabe ................ G01N 21/8851
                                                            382/149
(Continued)

FOREIGN PATENT DOCUMENTS

CN           103578105 A        2/2014
CN           106331238 A        1/2017
(Continued)

OTHER PUBLICATIONS

"First Office Action and English language translation", CN Application No. 201910083851.X, dated Jun. 28, 2020, 18 pp.
(Continued)

*Primary Examiner* — Ian L Lemieux
(74) *Attorney, Agent, or Firm* — Myers Bigel, P.A.

(57) ABSTRACT

A method for detecting dirt on a screen, a device for the same, an electronic device and a computer-readable storage medium are provided. The method includes acquiring a first image of the screen when the screen is displaying a first picture, determining a dirt detection area in the first image with a mask image, and detecting a position of the dirt within the dirt detection area. With the method provided by the embodiments of the disclosure, the positon of dirt on the screen could be detected based on at most two images of the screen. The time for detecting dirt on the screen is greatly shortened, and the efficiency of detection is enhanced.

12 Claims, 10 Drawing Sheets

(51) Int. Cl.
  *G06T 7/11* (2017.01)
  *G06T 7/00* (2017.01)

(56) References Cited

U.S. PATENT DOCUMENTS

| | | | | |
|---|---|---|---|---|
| 9,979,956 | B1* | 5/2018 | D'Amico | G06T 7/11 |
| 2003/0036866 | A1* | 2/2003 | Nair | G01N 21/95 |
| | | | | 702/81 |
| 2004/0027618 | A1* | 2/2004 | Nakamura | G06T 7/0004 |
| | | | | 358/3.26 |
| 2004/0098156 | A1* | 5/2004 | Hattori | G06T 7/0004 |
| | | | | 700/110 |
| 2015/0221077 | A1* | 8/2015 | Kawabata | G06T 7/337 |
| | | | | 382/141 |
| 2016/0363541 | A1* | 12/2016 | Yoshino | G01N 21/95607 |
| 2017/0023473 | A1* | 1/2017 | Wegner | G06T 7/143 |
| 2017/0115235 | A1* | 4/2017 | Ohlsson | G01N 21/59 |
| 2018/0202941 | A1* | 7/2018 | Konno | G01N 21/8851 |
| 2018/0246044 | A1* | 8/2018 | Zhang | G02F 1/1309 |
| 2019/0362486 | A1* | 11/2019 | Diao | G06K 9/4642 |
| 2020/0134845 | A1* | 4/2020 | Wang | G06T 7/337 |
| 2020/0265487 | A1* | 8/2020 | Silva | G06T 7/0004 |

FOREIGN PATENT DOCUMENTS

| | | | |
|---|---|---|---|
| CN | 107768269 A | | 3/2018 |
| CN | 108318503 A | | 7/2018 |
| CN | 108323204 A | | 7/2018 |
| CN | 108961185 A | | 12/2018 |
| JP | 2012156594 A | | 8/2012 |
| JP | 2013132042 A | * | 7/2013 ............. G06T 7/001 |

OTHER PUBLICATIONS

Xia, Chunrong, "Research on key technologies in binocular stereo vision processing", [Master's Theses Submitted May 30, 2014 to Nanjing University] China Masters Theses Full-text Database (CMFD) Information Technology Series, vol. 8, Aug. 15, 2016, 178 pp with English language translation.

* cited by examiner

DIRT DETECTION ON SCREEN

RELATED APPLICATION

The present application claims the benefit of Chinese Patent Application No. 201910083851.X, filed on Jan. 29, 2019, the entire disclosure of which is incorporated herein by reference.

TECHNICAL FIELD

The present disclosure relates to the field of controlling technologies, and specifically to a method and a device for detecting dirt on a screen, an electronic device and a computer-readable storage medium.

BACKGROUND

During a process of manufacturing a screen for a display device, if there is some dirt on a surface of the screen, a subsequent defect detection performed for the screen would be affected. Therefore, it is necessary to detect the dirt on the screen. In the related art, it is usually achieved by photographing the screen for several times with devices such as a microscope and a translation stage, and the position of dirt on the screen is determined with multiple images of the screen. As a result, the process for determining the position of dirt is time-consuming and causes a low detection efficiency. Moreover, during the process of photographing the screen, objects around the screen may come into the field of view of a camera which performs the photographing, which would have an adverse effect on the detection.

SUMMARY

An embodiment of the disclosure provides a method for detecting dirt on a screen, the method comprising: acquiring a first image of the screen when the screen is displaying a first picture; determining a dirt detection area in the first image with a mask image, and detecting a position of the dirt within the dirt detection area.

In some embodiments, the first picture comprises an all-black pattern.

In some embodiments, the method further comprises: acquiring a second image of the screen when the screen is displaying a second picture; segmenting the second image to obtain an area having a largest contour in the second image, and filling the area having the largest contour in the second image to obtain the mask image.

In some embodiments, segmenting the second image to obtain the area having the largest contour in the second image comprises: segmenting the second image with an image segmentation algorithm to obtain a largest segmented area; performing corrosion on the largest segmented area of the second image, and performing expansion on the largest segmented area after corrosion to obtain the area having the largest contour in the second image.

In some embodiments, performing corrosion on the largest segmented area of the second image comprises: convolving the largest segmented area of the second image with a mask to calculate a minimum value among pixel gray values of the largest segmented area corresponding to pixels of the mask other than a central pixel of the mask, and replacing a gray value of a pixel of the largest segmented area corresponding to the central pixel of the mask with the minimum value.

In some embodiments, performing expansion on the largest segmented area after corrosion to obtain the area having the largest contour in the second image comprises: convolving the largest segmented area of the second image with a mask to calculate a maximum value among pixel gray values of the largest segmented area corresponding to pixels of the mask other than a central pixel of the mask, and replacing a gray value of a pixel of the largest segmented area corresponding to the central pixel of the mask with the maximum value.

In some embodiments, the method further comprises: prior to segmenting the second image to obtain the area having the largest contour in the second image, compressing the second image with an image compression algorithm; and after filling the area having the largest contour in the second image, adjusting the second image so that the second image restores to an original size before being compressed.

In some embodiments, detecting the position of the dirt within the dirt detection area comprises: acquiring a binary edge image of the dirt detection area with an edge detection algorithm; extracting a contour of the binary edge image with a contour detection algorithm, and detecting the position of the dirt within the contour of the binary edge image.

Another embodiment of the disclosure provides a device for detecting dirt on a screen, comprising: a first image acquisition module configured to acquire a first image of the screen when the screen is displaying a first picture; a detection area determination module configured to determine a dirt detection area in the first image with a mask image, and a dirt positon acquisition module configured to detect a position of the dirt within the dirt detection area.

In some embodiments, the device further comprises a mask image generation module, the mask image generation module comprising: a second image acquisition sub-module configured to acquire a second image of the screen when the screen is displaying a second picture; a largest contour acquisition sub-module configured to segment the second image to obtain an area having a largest contour in the second image, and an image filling sub-module configured to fill the area having the largest contour in the second image to obtain the mask image.

In some embodiments, the largest contour acquisition sub-module comprises: a largest area acquisition unit configured to segment the second image with an image segmentation algorithm to obtain a largest segmented area of the second image; a corrosion unit configured to perform corrosion on the largest segmented area of the second image, and an expansion unit configured to perform expansion on the largest segmented area after corrosion to obtain the area having the largest contour in the second image. The corrosion unit comprises: a minimum value acquisition sub-unit configured to convolve the largest segmented area of the second image with a mask to calculate a minimum value among pixel gray values of the largest segmented area corresponding to pixels of the mask other than a central pixel of the mask, and a first gray value replacement sub-unit configured to replace a gray value of a pixel of the largest segmented area corresponding to the central pixel of the mask with the minimum value. The expansion unit comprises: a maximum value acquisition sub-unit configured to convolve the largest segmented area of the second image with the mask to calculate a maximum value among pixel gray values of the largest segmented area corresponding to pixels of the mask other than the central pixel of the mask, and a second gay value replacement sub-unit configured to replace the gray value of the pixel of the largest segmented area corresponding to the central pixel of the mask with the maximum value.

In some embodiments, the mask image generation module further comprises: an image compression sub-module configured to compress the second image with an image compression algorithm prior to segmenting the second image, and an image adjustment sub-module configured to adjust the second image where the area having the largest contour is filled, so that the second image restores to an original size before being compressed.

In some embodiments, the dirt positon acquisition module comprises a binary image acquisition sub-module configured to acquire a binary edge image of the dirt detection area with an edge detection algorithm; a contour extraction sub-module configured to extract a contour of the binary edge image with a contour detection algorithm, and a dirt position detection sub-module configured to detect the position of the dirt within the contour of the binary edge image.

Another embodiment of the disclosure provides an electronic device comprising an image sensor and a processor for controlling the image sensor, and the processor is further configured to execute the method according to any one of the foregoing embodiments.

In some embodiments, the electronic device comprises at least one selected from a group consisting of a camera, a mobile phone and a computer.

Yet another embodiment of the disclosure provides a computer-readable storage medium comprising computer instructions that, when executed by a processor, performs the method according to any one of the foregoing embodiments.

It should be understood that the above general description of the embodiments herein and the following details are intended to explain the spirit of the disclosure by way of examples, rather than limiting the scope of the patent application.

BRIEF DESCRIPTION OF DRAWINGS

The accompanying drawings serving as a part of the specification, together with the description, intend to set forth the principle of the disclosure.

DETAILED DESCRIPTION OF EMBODIMENTS

Figure 1:
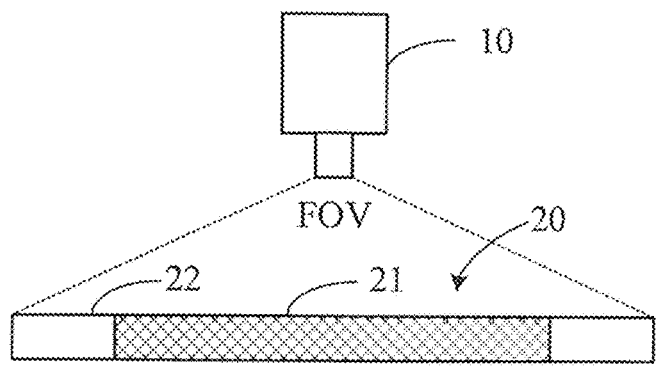
FIG. 1 schematically shows an application scenario according to an embodiment of the disclosure.

Exemplary embodiments of the disclosure will be described in detailed herein, examples of which are shown in the drawings. Unless indicated otherwise, in the following description relating to the drawings, the same reference number in different drawings refers to identical or similar element. The implementations embodied in the following exemplary embodiments do not represent all possible implementations that conform to the spirit of the disclosure, instead, they are just examples of methods and devices that are consistent with what are defined in the claims and some aspects of the disclosure.

An embodiment of the disclosure provides a method for detecting dirt on a screen. The method can be applied to a camera or a computer connected with the camera. The method will be described in detail by taking an example where the method proposed by the embodiment is applied in a camera. The term "dirt" herein should be interpreted in a broad way, i.e. it not only comprises dust falling onto the screen from the air, but also includes stains and contaminants that adhere to the screen in the process of the screen contacting other objects (e.g., human body or other device). That is to say, the term "dirt" herein may refer to any dust or pollution not belonging to the screen itself. Further, the disclosure does not make any limitation to the form or type of the screen, the screen includes but is not limited to various kinds of display panels, display modules and display screen, etc.

A scenario where the method proposed by the embodiment of the disclosure is applied is illustrated in FIG. 1. Referring to FIG. 1, a screen 20 to be detected is placed within a field of view (FOV) of a camera 10. The screen 20 comprises a display area 21 and a non-display area 22. Once the screen 20 is placed within in the FOV of the camera, the camera can photograph images of the screen, and then a position of dirt in the images of the screen can be determined.

Figure 2:
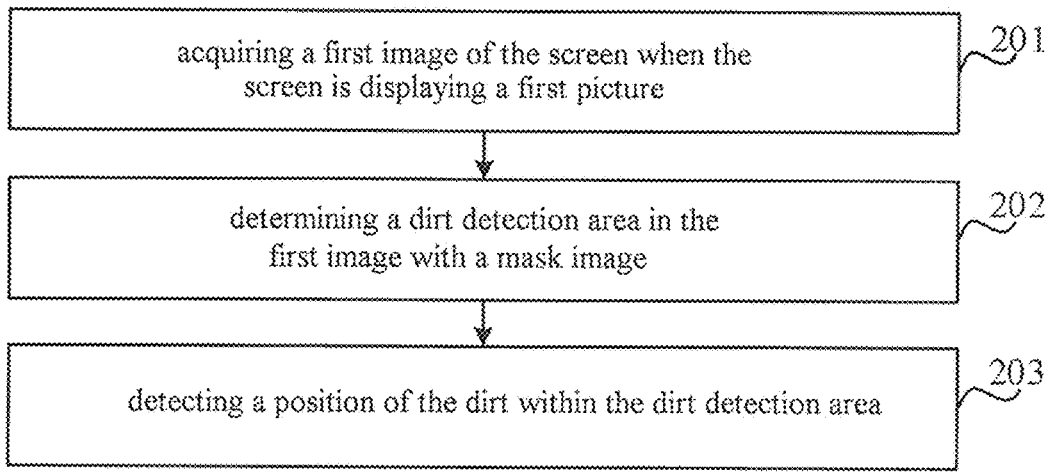
FIG. 2 shows a flow chart of a method for detecting dirt on a screen according to an embodiment of the disclosure.

FIG. 2 shows a flow chart of a method for detecting dirt on a screen according to an embodiment of the disclosure. Referring to FIG. 2, the method of detecting dirt on the screen comprises the following steps 201-203.

In step 201, a first image of the screen when the screen is displaying a first picture is acquired.

According to an embodiment of the disclosure, before the camera 10 acquires images of the screen 20 to be detected, the camera 10 (or a user) may control the screen 20 to display certain pictures, e.g., a first picture showing a first pattern and a second picture showing a second pattern. In some embodiments, the first pattern may be an all-black pattern, and the second pattern may be an all-white pattern. According to an embodiment of the disclosure, the camera 10 acquires a first image of the screen 20 when the screen 20 is displaying the first picture.

In step 202, a dirt detection area is determined in the first image with a mask image.

In an embodiment, the camera 10 may determine a dirt detection area in the first image by means of a mask image, and the dirt detection area may correspond to the display area 21 of the screen 20.

In an embodiment, the mask image is generated by the camera 10. The mask image can be generated before or after the first image is acquired. In an embodiment, the mask image is generated at the same time with the step of acquiring the first image. The person of ordinary skilled in the art can determine when to generate the mask image depending on application scenarios, which is not limited herein.

Figure 3:
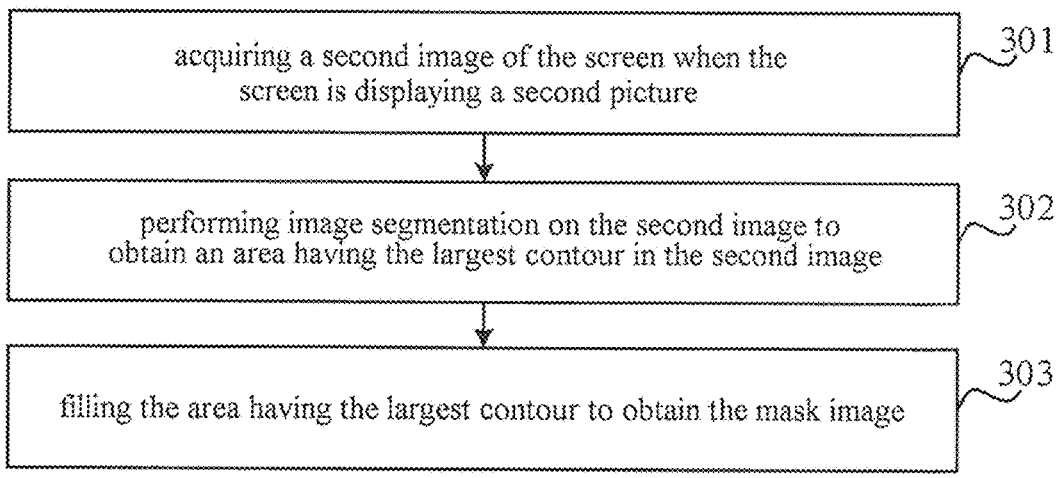
FIG. 3 is a flow chart of a process of acquiring a mask image according to an embodiment of the disclosure.

FIG. 3 schematically shows a process of generating the mask image by the camera 10, which may comprises the following steps 301-303.

In step 301, the camera 10 acquires a second image of the screen when the screen 20 is displaying a second picture. In an embodiment, the second picture is an all-white pattern. In case the first picture is an all-black pattern and the second picture is an all-white pattern, the camera 10 may photograph the screen to acquire the first image of the screen when the screen 20 is placed within the field of view of the camera and the screen is not powered (at this time, the screen is black). Subsequently, the camera 10 acquires the second image of the screen. In this way, the screen 20 is required to display the second picture for only one time after being powered on, thereby reducing the control to the screen.

Figure 4:
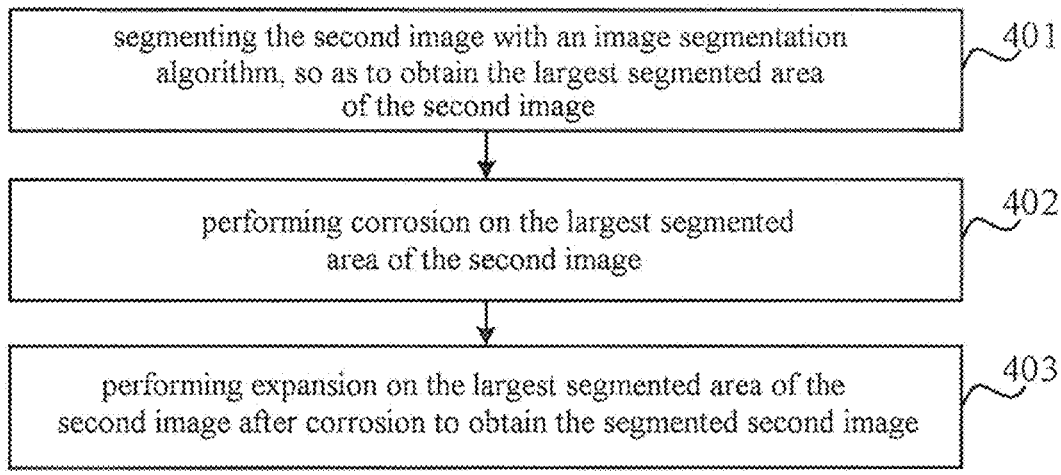
FIG. 4 is a flow chart of a process of segmenting the second image according to an embodiment of the disclosure.

In step 302, the camera 10 may perform image segmentation on the second image to obtain an area having a largest contour in the second image. Image segmentation means segmenting a digital image into a plurality of small image blocks (i.e. a collection of pixels), which is essentially a process of classifying pixels of the digital image. FIG. 4 illustrates an example of a process of performing image segmentation on the second image. In step 401, the camera 10 may segment the second image with an image segmentation algorithm known to the person of ordinary skill in the art, so as to obtain a largest segmented area of the second image. The image segmentation algorithm may be the Otsu method. Examples of the image segmentation algorithm may further include but not limited to Sobel operator, Robert operator, Laplace operator, Prewit operator, Kirsch operator, K-means clustering algorithm, fuzzy C-mean Clustering Algorithm and segmentation algorithm based on wavelet transformation. Through image segmentation, a binary image for the second image can be obtained. In step 402, the camera 10 may perform corrosion on the largest segmented area of the second image, and then in step 403, the camera 10 may perform expansion on the largest segmented area after corrosion.

Figure 5:
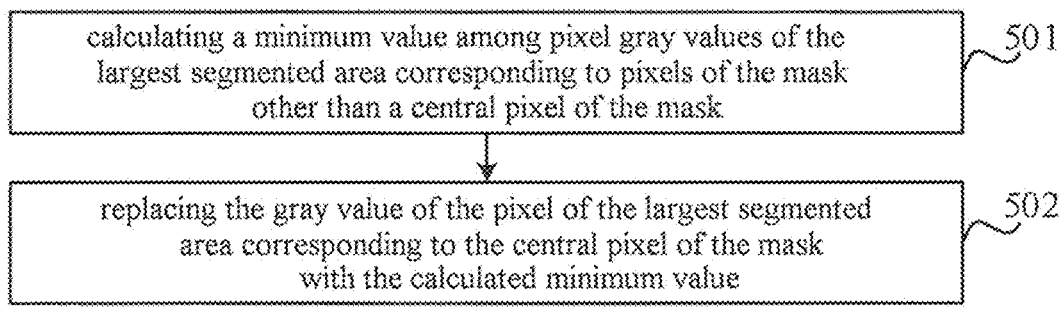
FIG. 5 is a flow chart of a process of performing corrosion on an image according to an embodiment of the disclosure.
Figure 6:
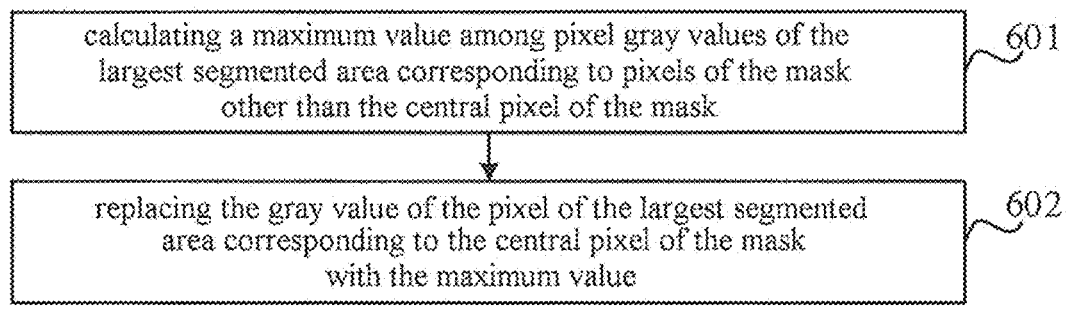
FIG. 6 is a flow chart of a process of performing expansion on an image according to an embodiment of the disclosure.

FIGS. 5 and 6 schematically show processes of performing corrosion and expansion on the largest segmented area of the second image, respectively. The mask (also called structure element) used during the corrosion and expansion can be set depending application scenarios. For example, the mask may be a matrix composed of values "0" and "1". Referring to FIG. 5, during the process of corrosion on the second image, the largest segmented area of the second image is scanned by the mask, i.e., the mask is convolved with the largest segmented area of the second image, thereby calculating a minimum value among pixel gray values of the largest segmented area corresponding to pixels of the mask other than a central pixel of the mask (step 501), and the calculated minimum value is used to replace the gray value of the pixel of the largest segmented area corresponding to the central pixel of the mask (step 502). In the process of expansion, referring to FIG. 6, the corroded largest segmented area of the second image is scanned by the mask, i.e., the mask is convolved with the corroded largest segmented area of the second image, thereby calculating a maximum value among pixel gray values of the largest segmented area corresponding to pixels of the mask other than the central pixel of the mask (step 601), then the gray value of the pixel of the largest segmented area corresponding to the central pixel of the mask is replaced with the maximum value (step 602).

In this embodiment, the area having the largest contour in the second image can be obtained by segmenting the second image, thereby identifying the boundary of the display area of the screen, which is advantageous to reduce the scope of the screen to be detected. Moreover, in this embodiment, burrs of edges of the largest segmented area can be removed by the corrosion; the contour of the largest segmented area can be more complete by the expansion, which is beneficial to the subsequent dirt detection.

In step 303, the camera 10 may fill the area having the largest contour in the second image to obtain the mask image previously mentioned. In this embodiment, with the mask image, it is possible to avoid acquiring the images of objects around the screen due to a too large field of view of the camera, so dirt detection would be restricted within the region where the screen is located, the accuracy of detecting dirt on the screen can be improved.

In the case where the camera 10 has a higher resolution, a large amount of data needs to be processed to perform segmentation, corrosion and expansion on the second image during the generation of the mask image. Therefore, in some embodiments, before segmenting the second image, the camera 10 may compress the second image of the screen with an image compression algorithm to reduce the resolution of the second image and the amount of data to be processed during the process of segmentation, corrosion and expansion, which is helpful to enhance the speed of generating the mask image.

Accordingly, in step 303, after the area having the largest contour in the second image is filled, the camera 10 may adjust the second image where the area having the largest contour is filled so that the adjusted second image has the same size with the second image uncompressed. In this way, it is ensured that the dirt detection area in the second image correspond to the display area 21 of the screen 20.

In step 203, a position of the dirt is detected within the dirt detection area.

Figure 7:
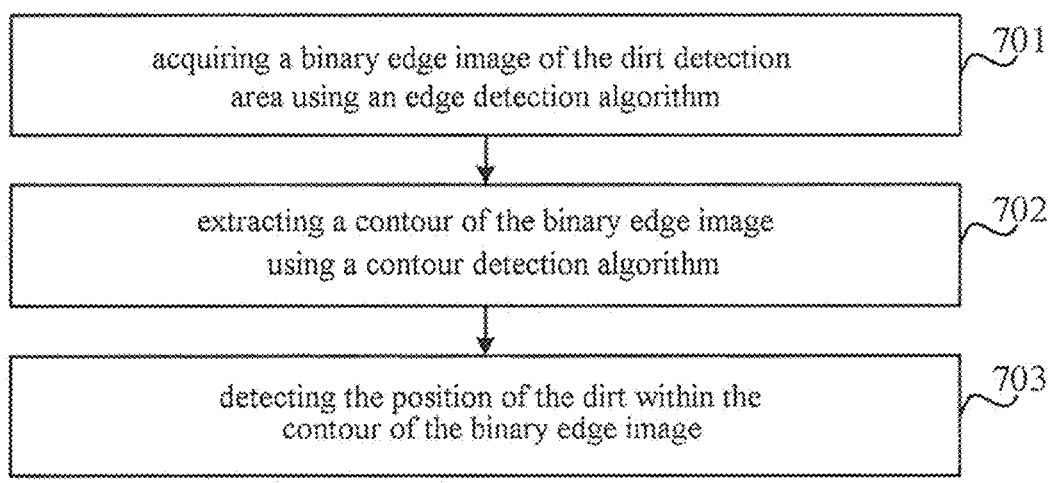
FIG. 7 is a flow chart of a process of detecting a position of dirt according to an embodiment of the disclosure.

In an embodiment, as shown in FIG. 7, the camera 10 may acquire a binary edge image of the dirt detection area using an edge detection algorithm (step 701). The edge detection algorithm may be any one selected from a group consisting of Canny operator, Roberts Cross operator, Prewitt operator, Sobel operator, Kirsch operator, Compass operator, Laplacian operator. Then the camera 10 may extract a contour of the binary edge image using a contour detection algorithm (step 702). Thereafter, the camera 10 can detect the position of the dirt within the contour of the binary edge image (step 703).

To sum up, by acquiring a first image of the screen to be detected, and determining a dirt detection area in the first image with a mask image, then the positon of the dirt can be detected within the dirt detection area. Therefore, for embodiments of the disclosure, the positon of dirt on the screen could be detected based on at most two images of the screen. The time for detecting dirt on the screen is greatly shortened, and the efficiency of detection is enhanced. Moreover, in the embodiment of the disclosure, the area where to perform dirt detection could be limited within the area where the screen is located, since the mask image can avoid photographing the objects around the screen which may be caused by a too large field of view of the camera, therefore the accuracy in detection is improved.

Figure 8:
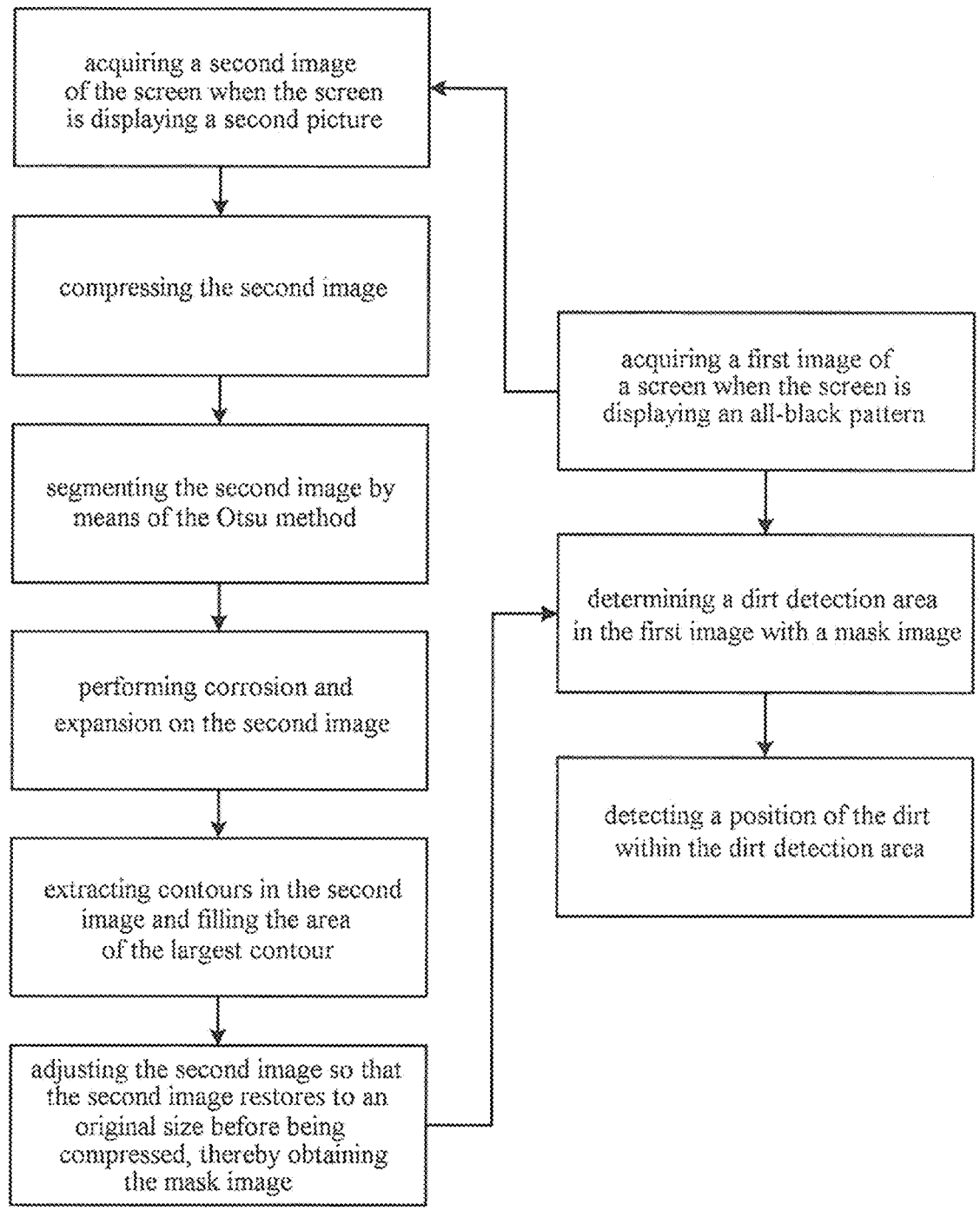
FIG. 8 is a flow chart of a method for detecting dirt on a screen according to an embodiment of the disclosure.
Figure 9:
FIGS. 9-14 are schematic views of images involved in the process of detecting dirt on a screen as shown in FIG. 8.

FIG. 8 is flow chart of a method of detecting dirt on a screen according to an embodiment of the disclosure. Referring to FIG. 8, the camera 10 may acquire a first image of a screen when the screen is displaying an all-black pattern, the first image being shown in FIG. 9. Alternatively, when the screen is turned off and not displaying any pictures, the camera 10 may acquire a first image by filling light on the screen by means of an additional optical device and then photographing the screen.

Figure 10:
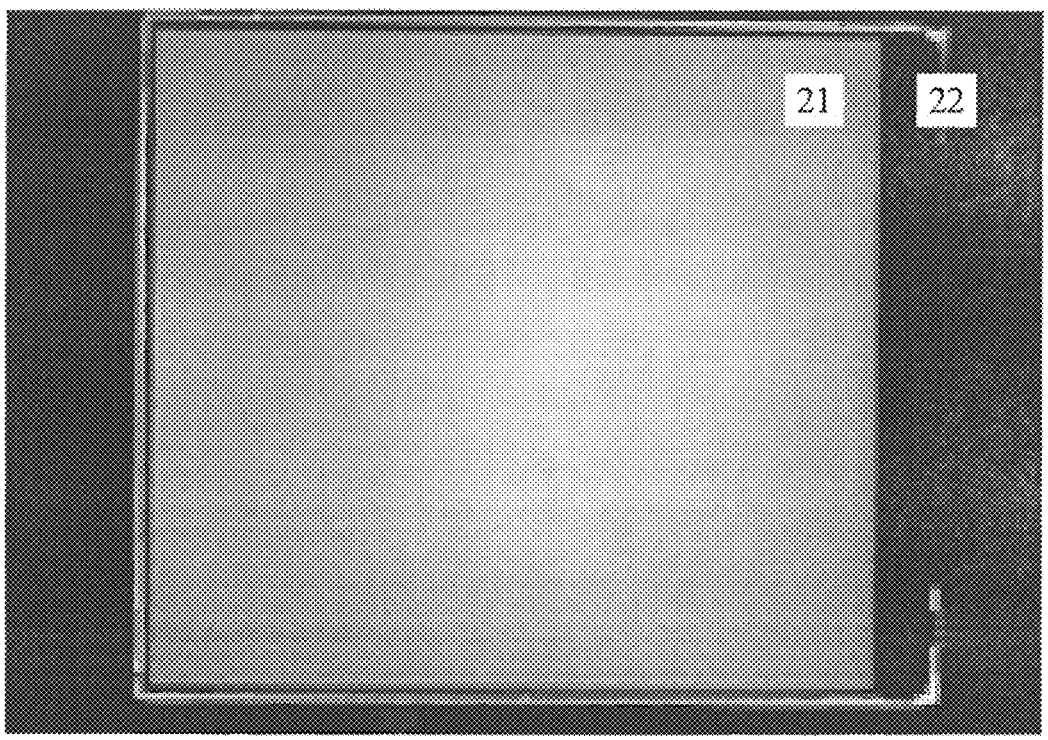

The camera may acquire a second image of the screen when the screen is displaying a second picture. Taking a screen having a pixel resolution of 1440*1600, an all-white picture having a resolution of 1440*1600 and a gray scale of 255 can be used as the second picture. The camera 10 photographs the screen and obtains a second image as shown in FIG. 10. Referring to FIG. 10, the second image comprises a display area 21 and a non-display area 22 including a metal frame etc., the non-display area 22 including the metal frame is an interference factor for the dirt detection.

The camera 10 may compress the second image to reduce the resolution of the second image. The compression algorithms that can be used include but are not limited to cubic convolution. Compressing the second image could enhance the speed of processing the second images by the camera, thereby improving the dirt detection efficiency.

Figure 11:
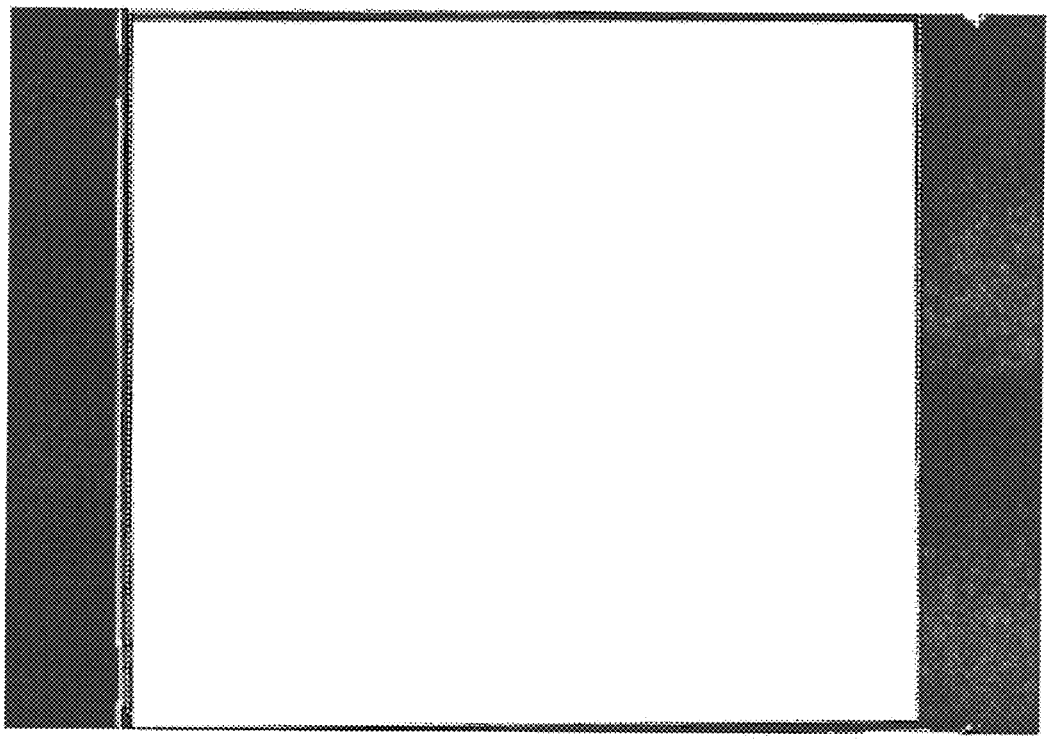

The camera 10 may segment the second image by means of the Otsu method to generate a binary image for the second image, thereby obtaining a largest segmented area of the second image indicated as a broken line of FIG. 11.

In an embodiment, the camera 10 performs corrosion on the binary image for the second image with a following mask (a 3*3 matrix):

$$\begin{bmatrix} 1, 1, 1 \\ 1, 0, 1 \\ 1, 1, 1 \end{bmatrix}.$$

In some embodiments, performing corrosion on the largest segmented area of the second image comprises: replacing a value of a pixel of the second image corresponding to the element "0" of the mask with a minimum value among values of the pixels of the second image corresponding to elements "1" of the mask. Corrosion on the second image can extract burrs of edges of the largest segmented area.

In some embodiments, the camera 10 proceeds to perform expansion on the second image after corrosion with the mask, and specifically, the value of the pixel of the second image corresponding to the element "0" of the mask is replaced with a maximum value among values of the pixels of the second image corresponding to the elements "1" of the mask. Expansion on the second image can eliminate the burrs of edges of the largest segmented area.

Figure 12:
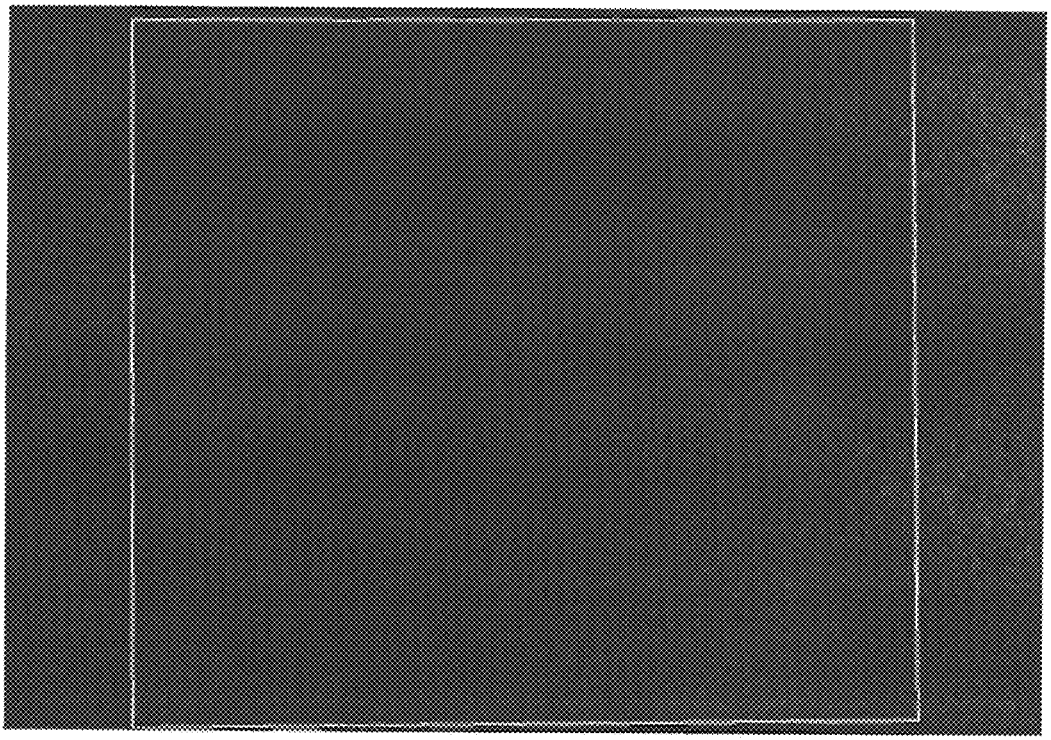

Thereafter, the camera 10 extracts contours in the second image after the corrosion and expansion, and then obtain the area of the largest contour of the second image as indicated by the white line in FIG. 12. The dirt detection area can be obtained by filling the area of the largest contour.

Figure 13:
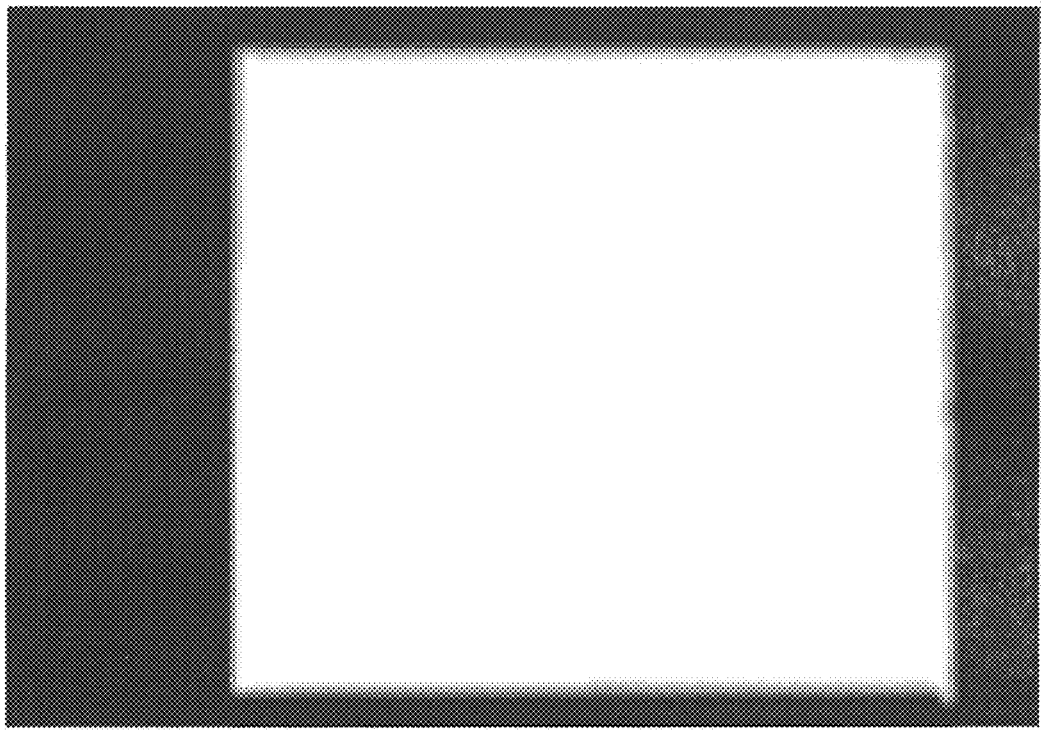

In some embodiments, after filling the area having the largest contour in the second image, the camera 10 adjusts the second image so that the second image restores to an original size before being compressed, hence the mask image shown in FIG. 13 is obtained.

Figure 14:
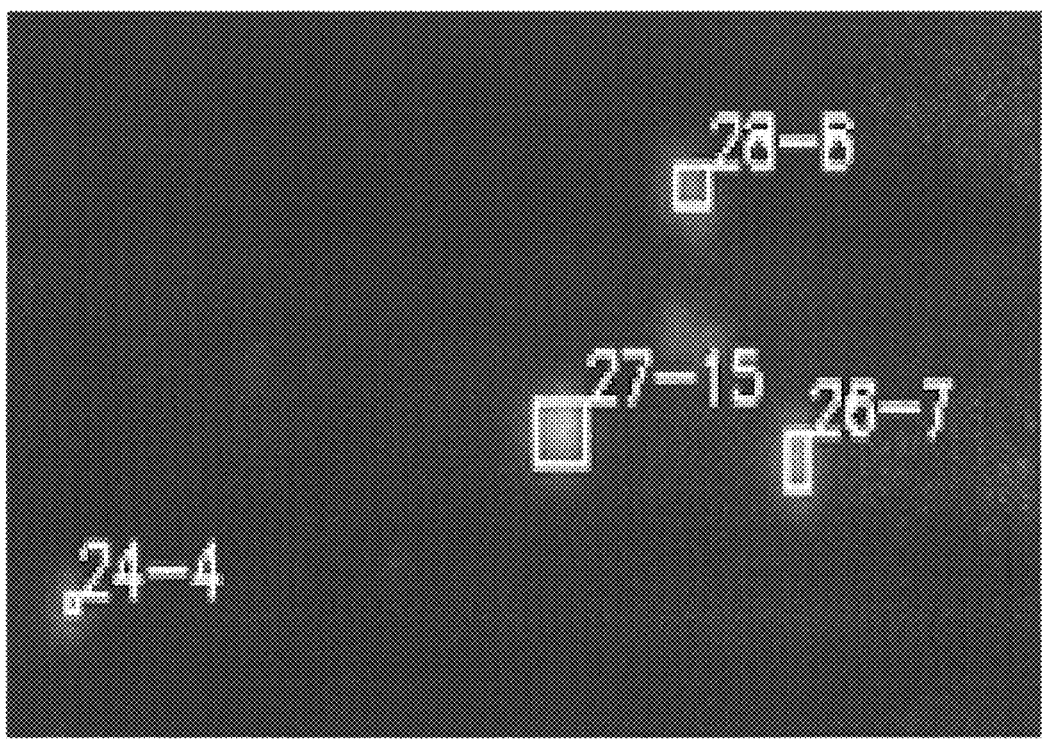

Subsequently, with the mask image, the camera 10 may perform a masking operation on the first image to exclude areas of the first image where dirt detection is not necessary, so that the dirt detection area is determined from the first image. In an example, the camera 10 may extract a contour of edges of the first image after the masking operation with an edge detection algorithm (e.g., Canny operator), so as to acquire a binary edge image of the dirt detection area. Next, the camera 10 may extract a contour of the binary edge image with a contour detection algorithm, and then identify and mark the dirt. Examples of the positions of dirt are shown in FIG. 14. For the person of ordinary skill in the art, it can be well understood that the term "edge" mentioned in the edge detection algorithm does not mean a boundary between objects, but refers to the areas where the values of pixels of an images suddenly change.

Figure 15:
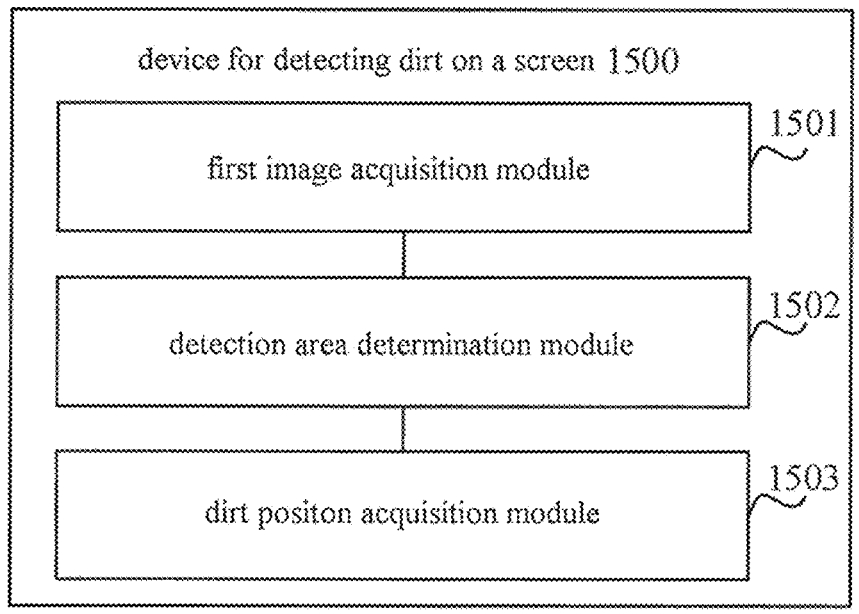
FIGS. 15-20 are block diagrams of a device for detecting dirt on a screen according to an embodiment of the disclosure.

Another embodiment of the disclosure provides a device for detecting dirt on a screen. FIG. 15 illustrates a block diagram of the device. Referring to FIG. 15, a device 1500 for detecting dirt on a screen according to an embodiment of the disclosure comprises: a first image acquisition module 1501 configured to acquire a first image of the screen when the screen is displaying a first picture; a detection area determination module 1502 configured to determine a dirt detection area in the first image with a mask image; and a dirt positon acquisition module 1503 configured to detect a position of the dirt within the dirt detection area.

In an embodiment, the first picture is an all-black pattern.

Figure 16:
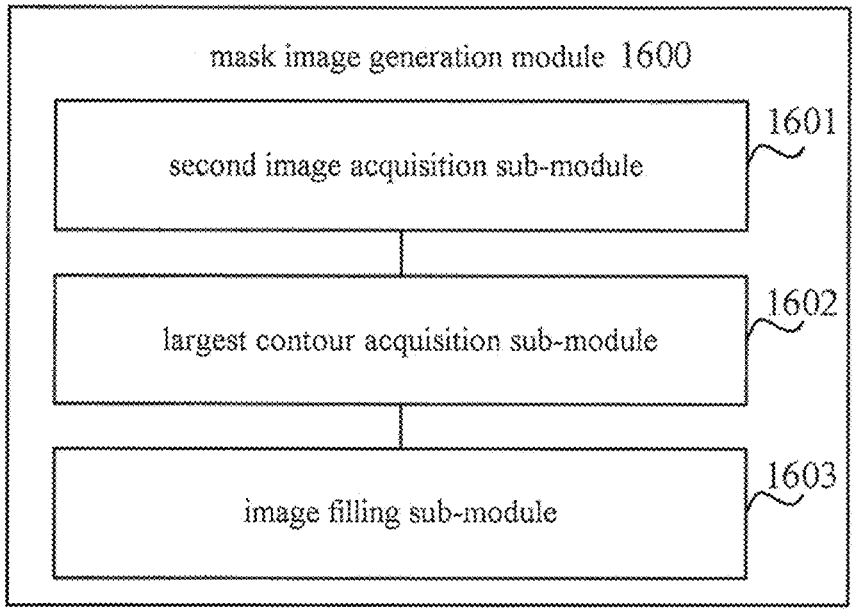

On the basis of what is shown in FIG. 15, referring to FIG. 16, a device 1500 for detecting dirt on a screen according to another embodiment of the disclosure further comprises a mask image generation module 1600. The mask image generation module 1600 comprises a second image acquisition sub-module 1601 configured to acquire a second image of the screen when the screen is displaying a second picture; a largest contour acquisition sub-module 1602 configured to segment the second image to obtain an area having the largest contour in the second image; and an image filling sub-module 1603 configured to fill the area having the largest contour in the second image to obtain the mask image.

Figure 17:
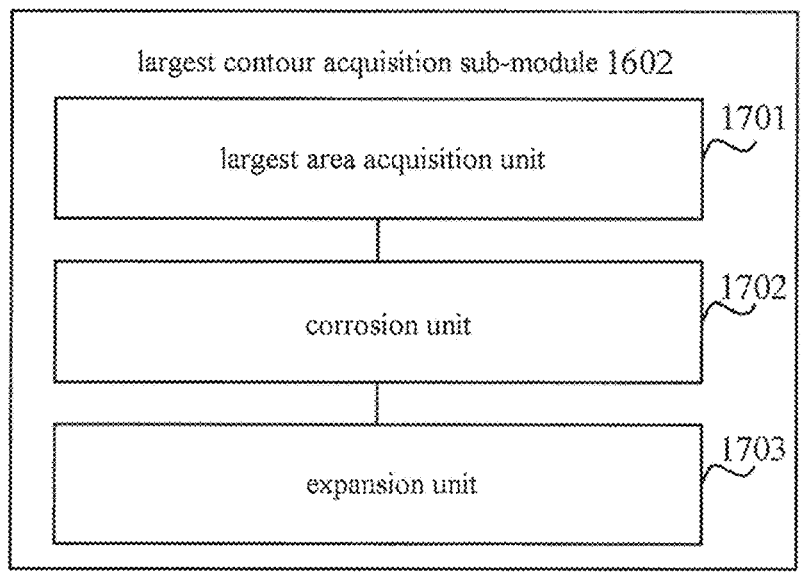

FIG. 17 illustrates a structural diagram of the largest contour acquisition sub-module shown in FIG. 16. Referring to FIG. 17, the largest contour acquisition sub-module 1602 comprises a largest area acquisition unit 1701 configured to segment the second image with an image segmentation algorithm to obtain a largest segmented area; a corrosion unit 1702 configured to perform corrosion on the largest segmented area of the second image; and an expansion unit 1703 configured to perform expansion on the largest segmented area after corrosion to obtain the area having the largest contour in the second image.

Figure 18:
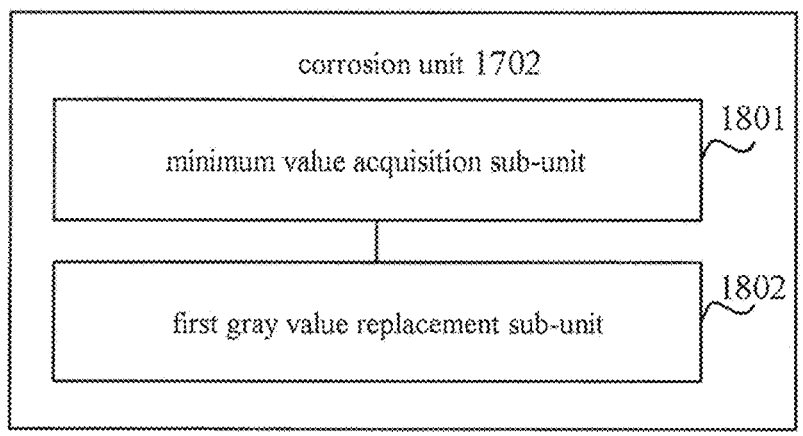

FIG. 18 schematically shows a block diagram for the corrosion unit 1702. Referring to FIG. 18, the corrosion unit 1702 comprises a minimum value acquisition sub-unit 1801 configured to convolve the largest segmented area of the second image with a mask to calculate a minimum value among pixel gray values of the largest segmented area corresponding to pixels of the mask other than a central pixel of the mask, and a first gray value replacement sub-unit 1802 configured to replace a gray value of a pixel of the largest segmented area corresponding to the central pixel of the mask with the minimum value.

Figure 19:
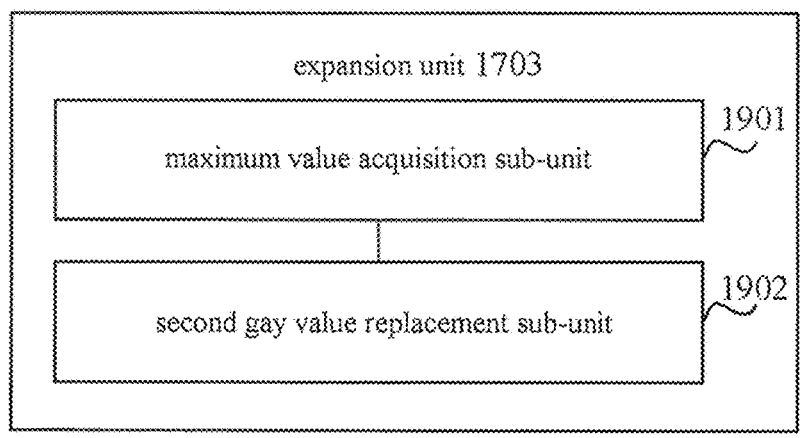

FIG. 19 schematically shows a block diagram of the expansion unit. Referring to FIG. 19, the expansion unit 1703 comprises a maximum value acquisition sub-unit 1901 configured to convolve the largest segmented area of the second image with a mask to calculate a maximum value among pixel gray values of the largest segmented area corresponding to pixels of the mask other than a central pixel of the mask, and a second gay value replacement sub-unit 1902 configured to replace a gray value of a pixel of the largest segmented area corresponding to the central pixel of the mask with the maximum value.

In an embodiment, the mask image generation module 1600 further comprises an image compression sub-module configured to compress the second image with an image compression algorithm prior to segmenting the second image, and an image adjustment sub-module configured to, after filling the area having the largest contour in the second image, adjust the second image so that the second image has a same size with the second image acquired when the screen is displaying a second picture.

Figure 20:
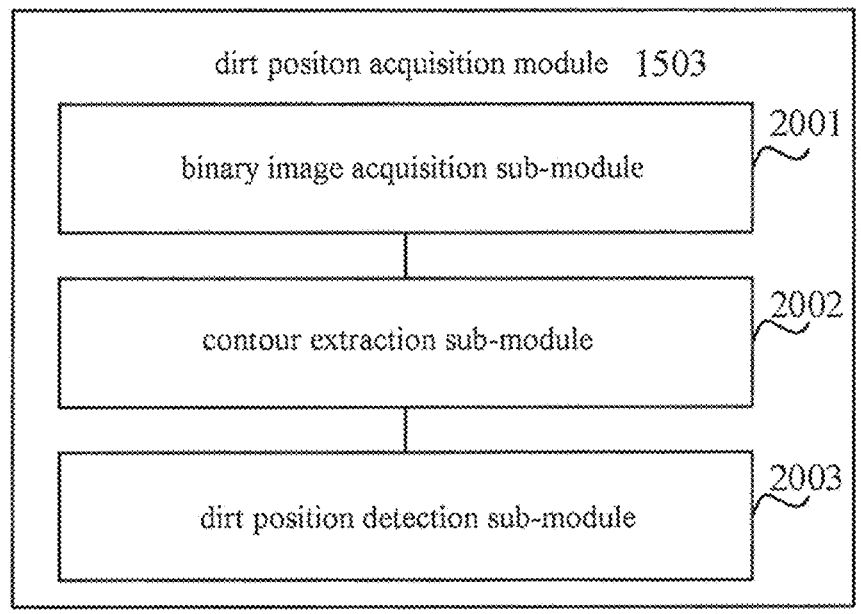

FIG. 20 schematically shows a block diagram of the dirt positon acquisition module. Referring to FIG. 20, the dirt positon acquisition module 1503 comprises: a binary image acquisition sub-module 2001 configured to acquire a binary edge image of the dirt detection area with an edge detection algorithm; a contour extraction sub-module 2002 configured to extract a contour of the binary edge image with a contour detection algorithm; and a dirt position detection sub-module 2003 configured to detect the position of the dirt within the contour of the binary edge image.

All the modules, sub-modules, units and sub-units stated above can be implemented in a form of a processor. Examples of the processor include but are not limited to a CPU, a micro-controller, a digital signal processor, a programmable logic device, a computer, etc. Algorithms in the form of programs for processing the image can be stored in the processor. Examples of the algorithms include but are not limited to Otsu method for image segmentation, image corrosion algorithm, image expansion algorithm, image compression algorithm, edge detection algorithm and contour detection algorithm. It can be appreciated that these modules, sub-modules, units and sub-units could be implemented in a single processor or in a multiple processors. Alternatively, the modules, sub-modules, units and sub-units can be implemented in pure soft. The specific implementation of the modules, sub-modules, units and sub-units are not limited herein.

Figure 21:
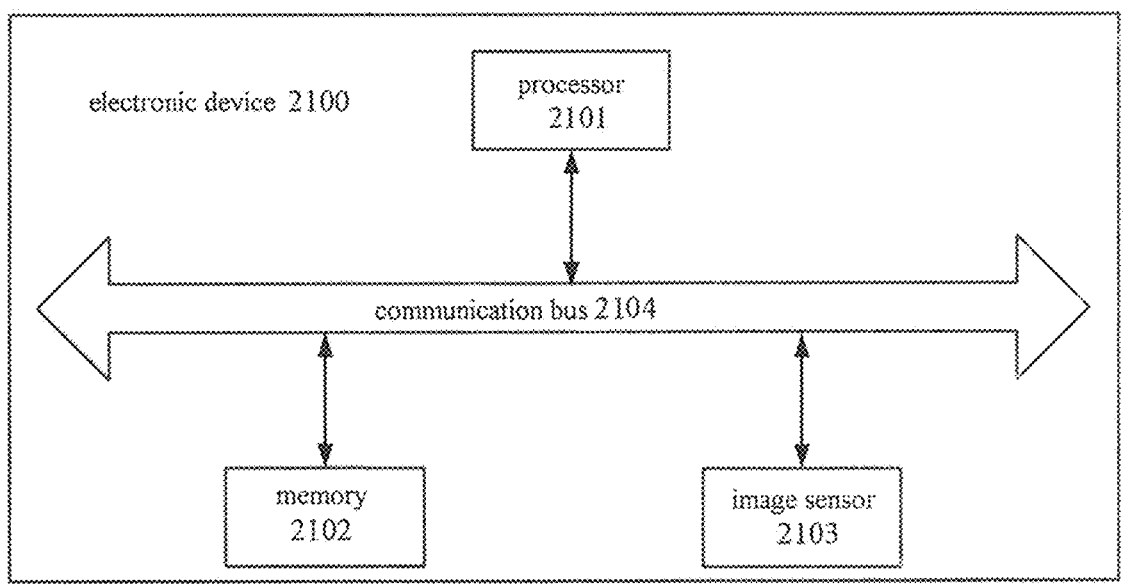
FIG. 21 is a schematic view showing a hardware structure of an electronic device according to an embodiment of the disclosure.

A further embodiment of the disclosure provides an electronic device 2100, the electronic device comprising an image sensor and a processor for controlling the image sensor. The image sensor is configured to sense or capture an image of an object, the processor is further configured to execute the method for detecting dirt on a screen according to any one of the above embodiments. Examples of the electronic device include but are not limited to a camera, a mobile phone and a computer. FIG. 21 shows a block diagram of an electronic device, which comprises an image sensor 2103, a processor 2101 and a memory 2102 for storing instruction executable by the processor 2101. The image sensor 2103 is configured to acquire an image of the screen, and the processor 2101 is communicatively connected with the memory through a communication bus 2104 and capable of reading executable instructions from the memory 2101, in order to implement the steps of the method illustrated in FIG. 2 to FIG. 14.

Yet another embodiment of the disclosure provides a computer-readable storage medium comprising computer instructions that, when executed by a processor, perform the method according to any of the embodiments shown in FIG. 2 to FIG. 14.

Such terms as "first", "second" mentioned herein are just for facilitating description of embodiments of the disclosure, rather than indicating or implying any relative importance. Unless otherwise defined, the terms such as "multiple" or "a plurality of" herein means two or more than two.

By considering the specification and implementing the embodiments described herein, the person of ordinary skill in the art could easily conceive of other embodiments that are consist with the spirit of the disclosure. The present application intends to encompass any variations, usage, and modifications to the embodiments disclosed herein, which conform to a general principle revealed herein and comprise common knowledges or conventional technical measures in the art. Therefore, the embodiments and figures set forth in the specification should be interpreted as examples, and the scope of the application is defined by the appended claims.

The invention claimed is:

1. A method for detecting dirt on a screen, comprising:
   acquiring a first image of the screen when the screen is displaying a first picture;
   determining a dirt detection area in the first image with a mask image; and
   detecting a position of the dirt within the dirt detection area,
   acquiring a second image of the screen when the screen is displaying a second picture, the second image comprising an all-white pattern;
   compressing the second image with an image compression algorithm;
   segmenting the second image to obtain an area having a largest contour in the second image;
   filling the area having the largest contour in the second image; and
   adjusting the second image so that the second image restores to an original size before being compressed, thereby obtaining the mask image.

2. The method according to claim 1, wherein the first picture comprises an all-black pattern.

3. The method according to claim 1, wherein segmenting the second image to obtain the area having the largest contour in the second image comprises:
   segmenting the second image with an image segmentation algorithm to obtain a largest segmented area;
   performing corrosion on the largest segmented area of the second image; and
   performing expansion on the largest segmented area after performing corrosion to obtain the area having the largest contour in the second image.

4. The method according to claim 3, wherein performing corrosion on the largest segmented area of the second image comprises:
   convolving the largest segmented area of the second image with a mask to calculate a minimum value among pixel gray values of the largest segmented area corresponding to pixels of the mask other than a central pixel of the mask; and
   replacing a gray value of a pixel of the largest segmented area corresponding to the central pixel of the mask with the minimum value.

5. The method according to claim 3, wherein performing expansion on the largest segmented area after performing corrosion to obtain the area having the largest contour in the second image comprises:
   convolving the largest segmented area of the second image with a mask to calculate a maximum value among pixel gray values of the largest segmented area corresponding to pixels of the mask other than a central pixel of the mask; and
   replacing a gray value of a pixel of the largest segmented area corresponding to the central pixel of the mask with the maximum value.

6. The method according to claim 1, wherein detecting the position of the dirt within the dirt detection area comprises:
acquiring a binary edge image of the dirt detection area with an edge detection algorithm;
extracting a contour of the binary edge image with a contour detection algorithm; and
detecting the position of the dirt within the contour of the binary edge image.

7. A device for detecting dirt on a screen, comprising:
a first image acquisition module configured to acquire a first image of the screen when the screen is displaying a first picture;
a detection area determination module configured to determine a dirt detection area in the first image with a mask image; and
a dirt position acquisition module configured to detect a position of the dirt within the dirt detection area,
a mask image generation module, wherein the mask image generation module comprises:
a second image acquisition sub-module configured to acquire a second image of the screen when the screen is displaying a second picture, the second image comprising an all-white pattern;
a largest contour acquisition sub-module configured to segment the second image to obtain an area having a largest contour in the second image;
an image filling sub-module configured to fill the area having the largest contour in the second image to obtain the mask image;
an image compression sub-module configured to compress the second image with an image compression algorithm prior to segmenting the second image; and
an image adjustment sub-module configured to adjust the second image where the area having the largest contour is filled, so that the second image restores to an original size before being compressed.

8. The device according to claim 7, wherein the largest contour acquisition sub-module comprises:
a largest area acquisition unit configured to segment the second image with an image segmentation algorithm to obtain a largest segmented area of the second image;
a corrosion unit configured to perform corrosion on the largest segmented area of the second image; and
an expansion unit configured to perform expansion on the largest segmented area after performing corrosion to obtain the area having the largest contour in the second image,
wherein the corrosion unit comprises:
a minimum value acquisition sub-unit configured to convolve the largest segmented area of the second image with a mask to calculate a minimum value among pixel gray values of the largest segmented area corresponding to pixels of the mask other than a central pixel of the mask; and
a first gray value replacement sub-unit configured to replace a gray value of a pixel of the largest segmented area corresponding to the central pixel of the mask with the minimum value,
wherein the expansion unit comprises:
a maximum value acquisition sub-unit configured to convolve the largest segmented area of the second image with the mask to calculate a maximum value among the pixel gray values of the largest segmented area corresponding to the pixels of the mask other than the central pixel of the mask; and
a second gray value replacement sub-unit configured to replace the gray value of the pixel of the largest segmented area corresponding to the central pixel of the mask with the maximum value.

9. The device according to claim 7, wherein the dirt position acquisition module comprises:
a binary image acquisition sub-module configured to acquire a binary edge image of the dirt detection area with an edge detection algorithm;
a contour extraction sub-module configured to extract a contour of the binary edge image with a contour detection algorithm; and
a dirt position detection sub-module configured to detect the position of the dirt within the contour of the binary edge image.

10. An electronic device comprising an image sensor and a processor for controlling the image sensor, wherein the processor is further configured to execute the method according to claim 1.

11. The electronic device according to claim 10, wherein the electronic device comprises at least one selected from a group comprising a camera, a mobile phone and a computer.

12. A non-transitory computer-readable storage medium comprising computer instructions that, when executed by a processor, performs the method according to claim 1.

* * * * *